United States Patent
Lee

(10) Patent No.: US 10,081,399 B2
(45) Date of Patent: Sep. 25, 2018

(54) REMOVABLE SPOILER WING ASSEMBLY

(71) Applicant: Thomas Yu Lee, Hillsborough, CA (US)

(72) Inventor: Thomas Yu Lee, Hillsborough, CA (US)

( * ) Notice: Subject to any disclaimer, the term of this patent is extended or adjusted under 35 U.S.C. 154(b) by 0 days.

(21) Appl. No.: 15/379,108

(22) Filed: Dec. 14, 2016

(65) Prior Publication Data

US 2018/0118281 A1    May 3, 2018

(30) Foreign Application Priority Data

Nov. 3, 2016  (TW) .............................. 105216776 U

(51) Int. Cl.
*B62D 35/00*    (2006.01)
*B62D 37/02*    (2006.01)

(52) U.S. Cl.
CPC ........... *B62D 35/007* (2013.01); *B62D 37/02* (2013.01)

(58) Field of Classification Search
CPC .............................. B62D 35/007; B62D 37/02
USPC ....................................................... 296/180.1
See application file for complete search history.

(56) References Cited

U.S. PATENT DOCUMENTS

| | | | | |
|---|---|---|---|---|
| 3,424,490 A | * | 1/1969 | Francis | B60J 11/08 160/370.21 |
| 4,978,161 A | * | 12/1990 | Schulze | B60J 7/106 29/401.1 |
| 5,306,156 A | * | 4/1994 | Gibbs | B60Q 1/302 224/315 |
| 7,052,074 B2 | * | 5/2006 | Dringenberg | B62D 35/007 296/180.5 |
| 2008/0018133 A1 | * | 1/2008 | Lin | B60Q 1/2661 296/180.1 |

* cited by examiner

*Primary Examiner* — Jason S Daniels
(74) *Attorney, Agent, or Firm* — Christensen, Fonder, Dardi & Herbert PLLC

(57) ABSTRACT

A removable spoiler wing assembly having a trunk lid portion, a fix portion, a primary spoiler wing structure, and a secondary spoiler wing structure is provided. The trunk lid portion has a first end and a second end opposite the first end. The fix portion is disposed on the second end of the trunk lid portion. The primary spoiler wing structure is removable and is disposed on the fix portion. The secondary spoiler wing structure is removable and is disposed on the second end of the trunk lid portion, the fix portion, or the primary spoiler wing structure.

6 Claims, 4 Drawing Sheets

REMOVABLE SPOILER WING ASSEMBLY

This application claims priority to Taiwan Patent Application No. 105216776 filed on Nov. 3, 2016, which is hereby incorporated by reference in its entirety.

CROSS-REFERENCES TO RELATED APPLICATIONS

Not applicable.

BACKGROUND OF THE INVENTION

Field of the Invention

The present invention relates to a removable spoiler wing assembly, and more particularly, relates to a removable wing assembly that is able to be quickly assembled to or removed from a movable vehicle to enhance a downward pressing force applied to the movable vehicle during driving.

Descriptions of the Related Art

Appearances of movable vehicles such as the common four seaters are usually designed by the manufacturers to satisfy the needs of driving in general road conditions. Therefore, most of the vehicles have only a streamlined appearance having a low wind resistance because they have to make a compromise between such considerations as the driving safety and subsequent maintenance and repair.

Accordingly, users having special interests in racing activities have to install an additional aerodynamic kit on their vehicles to improve performances of the vehicles during high-speed driving. Spoiler wing assemblies that are easy to be installed and that can enhance the road holding during driving of the vehicle to improve the stability during high-speed driving become preferred options for such users.

However, spoiler wing assemblies of vehicles in the prior art are installed on back ends of the vehicles through fastening or adhering to prevent detachment of the spoiler wing assemblies during driving of the vehicles. Then once the spoiler wing assemblies are installed, they cannot be removed through use of simple tools within a short time. In other words, time equal to or even more than that taken to install the spoiler wing assemblies has to be taken to restore the vehicles into the state presented prior to installation of the spoiler wing assemblies.

On the other hand, when the vehicles with the spoiler wing assembly installed thereon drive in general road conditions instead of in a racing condition, the great downward pressing force generated by the spoiler wing assembly tends to accelerate wearing of the tires and increase the fuel consumption and tends to cause difficulty in making turns.

Accordingly, an urgent need exists in the art to provide a spoiler wing assembly that satisfies different driving needs and can be quickly installed and removed so that vehicles provided with such a spoiler wing assembly have adequate stability in racing conditions and can have the spoiler wing assembly removed when driving in general road conditions to avoid the great downward pressing force.

SUMMARY OF THE INVENTION

An objective of the present invention is to provide a removable spoiler wing assembly, which allows the user to quickly assemble the spoiler wing assembly or remove the spoiler wing assembly with time less than that taken to assemble the spoiler wing assembly in response to different driving needs. This can increase stability of a vehicle provided with the removable spoiler wing assembly of the present invention during high-speed driving, and avoid increase in wearing of tires and fuel consumption of the vehicle when the vehicle is driving in general road conditions.

To achieve the aforesaid objective, the removable spoiler wing assembly of the present invention comprises a trunk lid portion, a fix portion, a primary spoiler wing structure and a secondary spoiler wing structure. The trunk lid portion has a first end and a second end opposite the first end; the fix portion is disposed on the second end of the trunk lid portion; the primary spoiler wing structure is removably disposed on the fix portion; and the secondary spoiler wing structure is removably disposed on the second end of the trunk lid portion, the fix portion or the primary spoiler wing structure.

To achieve the aforesaid objective, the primary spoiler wing structure of the removable spoiler wing assembly of the present invention has a support portion and a primary spoiler wing, the primary spoiler wing is disposed on an upper end of the support portion, and the support portion is removably fixed by a lower end thereof and the fix portion.

To achieve the aforesaid objective, the secondary spoiler wing structure of the removable spoiler wing assembly of the present invention has two secondary spoiler wings that are removably disposed on a left side and a right side of the second end of the trunk lid portion, the fix portion or the primary spoiler wing structure respectively.

To achieve the aforesaid objective, each of the two secondary spoiler wings of the removable spoiler wing assembly of the present invention has at least one air inlet extending from a front end of the secondary spoiler wing to a back end of the secondary spoiler wing so that, when an air flow flows through the at least one air inlet of the secondary spoiler wing, an additional downward pressing force can be provided.

To achieve the aforesaid objective, the trunk lid portion of the removable spoiler wing assembly of the present invention further has an auxiliary air inlet so that, in case a vehicle has the rear-engine, air is forced into the engine.

To achieve the aforesaid objective, the fix portion of the removable spoiler wing assembly of the present invention has at least one heat dissipation opening which communicates with the auxiliary air inlet to improve the efficiency of cooling down the working temperature of the engine of the vehicle.

To achieve the aforesaid objective, the removable spoiler wing assembly of the present invention further comprises a quick-release device adapted to removably install the secondary spoiler wing structure to the second end of the trunk lid portion, the fix portion or the primary wing structure. The quick-release device adopts a fastening tool provided by the manufacturer of the vehicle equipped with the removable spoiler wing assembly of the present invention.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention relates to a removable spoiler wing assembly, which is able to be quickly assembled to or removed from a movable vehicle (e.g., a sedan or a sports car) and is disposed to enhance the downward pressing force applied to the movable vehicle during driving.

Figure 1:
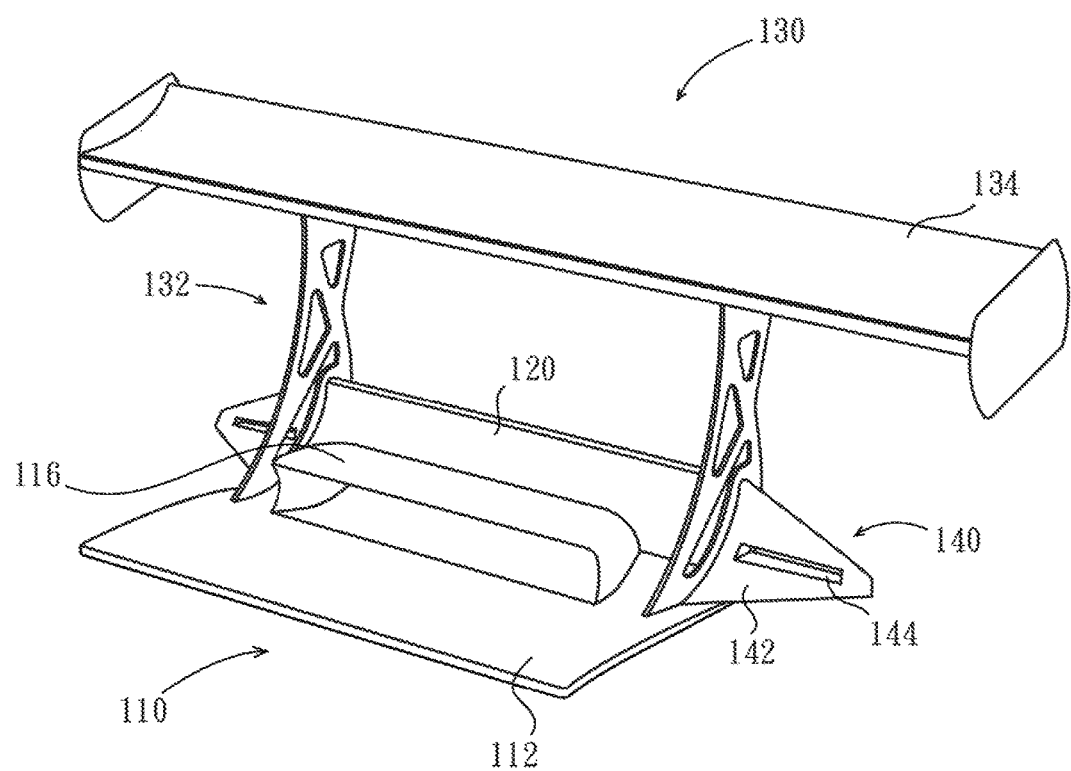
FIG. 1 is a perspective view of a removable spoiler wing assembly according to the present invention.
Figure 4:
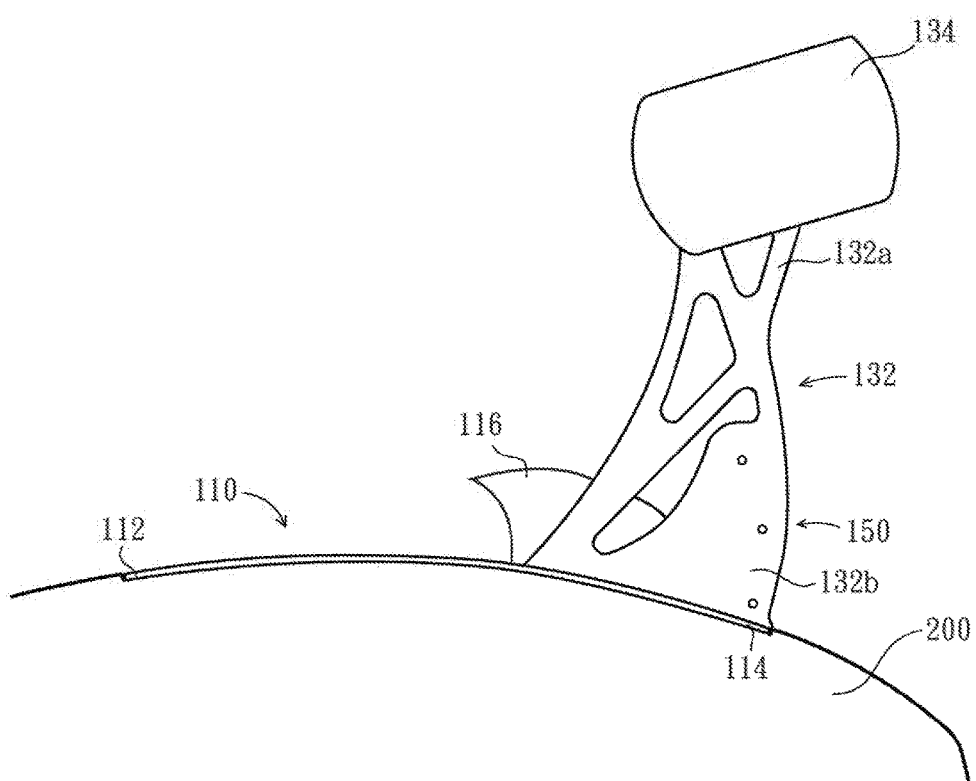
FIG. 4 is a side view of the removable spoiler wing assembly according to the present invention when being disposed on a movable vehicle but not being provided with the secondary spoiler wing structure.

As shown in FIG. 1, the removable spoiler wing assembly 100 of the present invention comprises a trunk lid portion 110, a fix portion 120, a primary wing structure 130 and a secondary wing structure 140. Referring to FIG. 4 together, in this embodiment, the trunk lid portion 110 is disposed at a back end (i.e., the trunk) of a movable vehicle 200; and the trunk lid portion 110 has a first end 112 and a second end 114 disposed opposite the first end 112. The fix portion 120 is disposed on a second end 114 of the trunk lid portion 110. The primary wing structure 130 is removably disposed on the fix portion 120, and the secondary spoiler wing structure 140 is removably disposed on the second end 114 of the trunk lid portion 110, the fix portion 120 or the primary spoiler wing structure 130.

In other words, in the present invention, only the primary spoiler wing structure 130 is limited to be removably disposed on the fix portion 120, while the secondary spoiler wing structure 140 may be removably disposed on one of (1) the second end 114 of the trunk lid portion 110, (2) the fix portion 120 or (3) the primary spoiler wing structure 130 optionally depending on different design requirements including the appearance and the wind resistance.

Referring still to FIG. 1 and FIG. 4, the primary spoiler wing structure 130 of the removable spoiler wing assembly 100 according to the present invention has a support portion 132 and a primary spoiler wing 134. The primary spoiler wing 134 is disposed on an upper end 132a of the support portion 132, and the support portion 132 is removably fixed by a lower end 132b thereof and the fix portion 120.

It shall be appreciated that, although the lower end 132b of the support portion 132 is shown to be disposed at the left side and the right side of the fix portion 120, this is not intended to limit the present invention.

Figure 2:
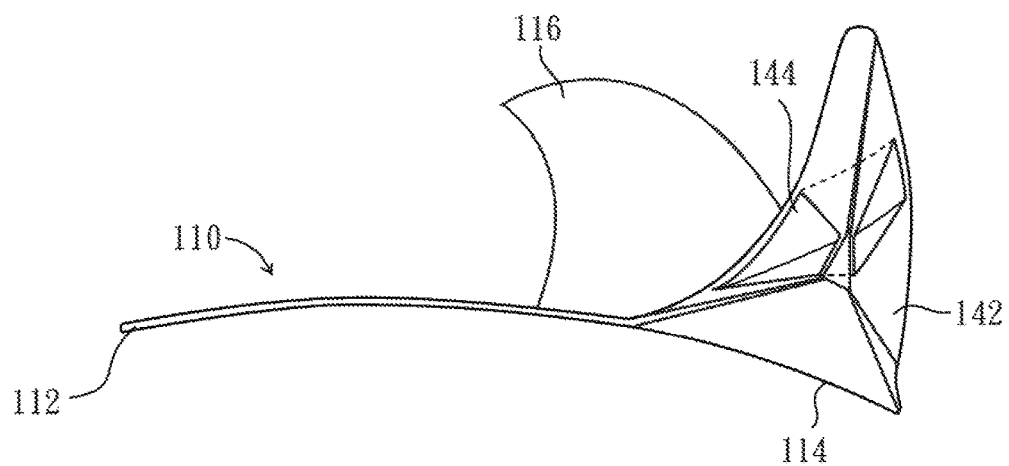
FIG. 2 is a schematic view of an air inlet of a secondary spoiler wing structure when a primary spoiler wing structure of the removable spoiler wing assembly according to the present invention is removed.
Figure 2A:
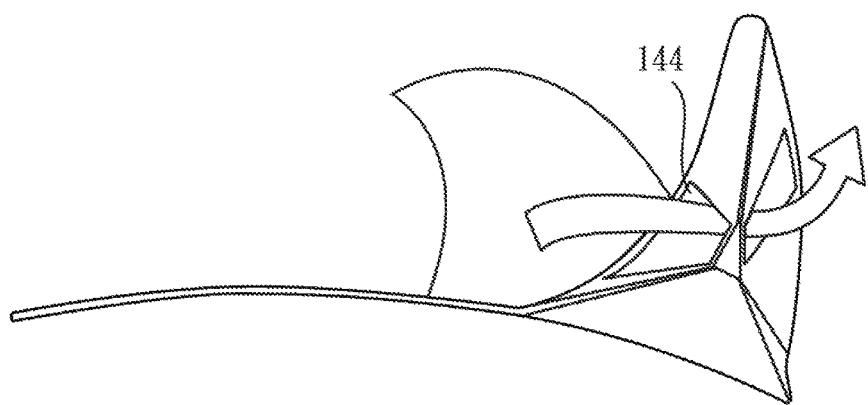
FIG. 2a is a schematic view illustrating an air flow through the air inlet of the secondary spoiler wing structure of the primary spoiler wing assembly according to the present invention during driving.
Figure 3:
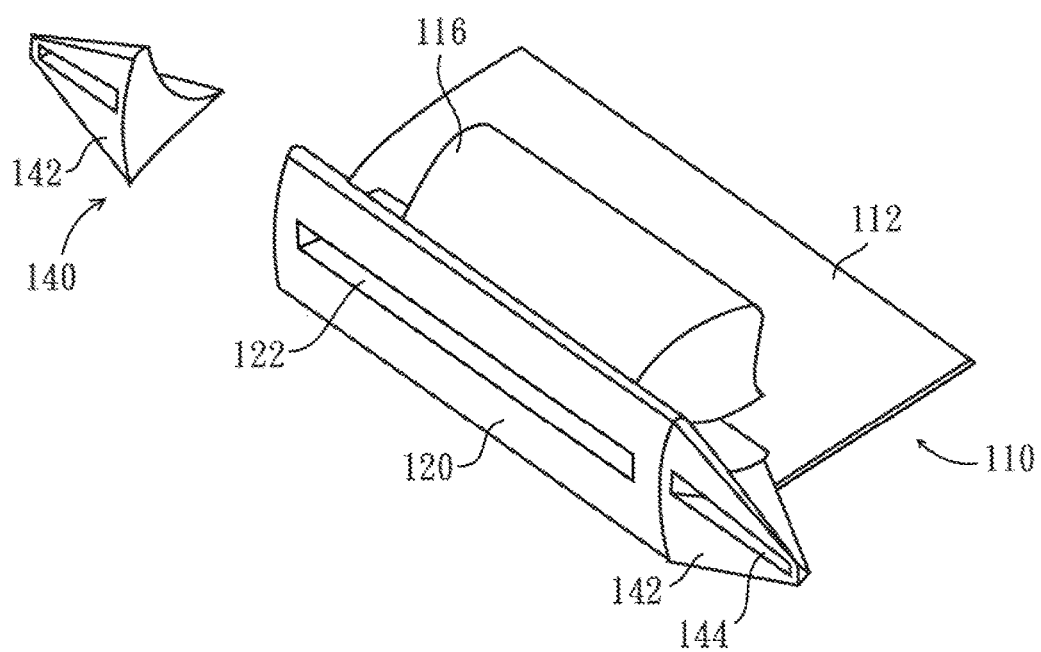
FIG. 3 is a schematic view of a removable spoiler wing assembly according to the present invention when being provided with the secondary spoiler wing structure.

In an embodiment shown in FIG. 3, the secondary spoiler wing structure 140 comprises two secondary spoiler wings 142. The two secondary spoiler wings 142 are removably disposed at the left side and the right side of the fix portion 120 respectively, and as shown in FIG. 2 and FIG. 2a, each of the two secondary spoiler wings 142 has an air inlet 144 extending from a front end of the secondary spoiler wing 142 to a back end of the secondary spoiler wing 142. In this way, an air flow passing through the air inlet 144 of each of the secondary spoiler wings 142 will experience a change in direction to provide an auxiliary downward pressing force during driving of the movable vehicle 200.

However, in addition to the implementation shown herein, the two secondary spoiler wings 142 may also be removably disposed on the second end 114 of the trunk lid portion 110 or at the left and the right sides respectively of the primary spoiler wing structure 130 depending on other design requirements as described above, and this can also achieve the purpose of providing an auxiliary downward pressing force.

Referring to FIG. 1 and FIG. 3 again, the trunk lid portion 110 of the removable spoiler wing assembly 100 according to the present invention further comprises an auxiliary air inlet 116 so that, in case a vehicle has the rear-engine, air is forced into the engine. The fix portion 120 further comprises a heat dissipating opening 122 which communicates with the auxiliary air inlet 116 to improve the efficiency of cooling down the working temperature of the engine of the movable vehicle 200.

In an embodiment shown in FIG. 4, the removable spoiler wing assembly 100 of the present invention further comprises a quick-release device 150 adapted to removably install the secondary spoiler wing structure 140 to the fix portion 120. It shall be appreciated that, the quick-release device 150 adopts a fastening tool provided by the manufacturer of the vehicle equipped with the removable spoiler wing assembly 100 of the present invention, so the removable spoiler wing assembly 100 of the present invention can be quickly assembled or removed without having to purchase any additional installing tools.

In the present invention, the term "quickly assembled or removed" is relative to the time necessary for assembly or removal in the prior art. That is, the operation time for quick assembling or removal set forth in the present invention means that the operation time is less than the original operation time for installation.

Actually, when the removable spoiler wing assembly 100 of the present invention is installed on the movable vehicle 200, removing the primary spoiler wing structure 130 and the secondary spoiler wing structure 140 from the fix portion 120 or installing the primary spoiler wing structure 130 and the secondary spoiler wing structure 140 back to the fix portion 120 takes only about 5 to 10 minutes. Thus, as compared with the assembling or removing time of 2 to 4hours that is needed in the prior art, quick assembling or removal can be achieved.

Because after the removable spoiler wing assembly 100 of the present invention is removed, only the trunk lid portion 110 and the fix portion 120 remain at the back end of the movable vehicle 200 and the primary spoiler wing structure 130 and the secondary spoiler wing structure 140 are removed, the unnecessary downward pressing force during driving in general load conditions is avoided and the user can park the movable vehicle more conveniently to save the necessary parking space.

According to the above descriptions, the removable spoiler wing assembly of the present invention allows the user to quickly assemble the spoiler wing assembly or remove the spoiler wing assembly with time less than the original operation time for installation in response to different driving needs. This can increase stability of a vehicle provided with the removable spoiler wing assembly of the present invention during high-speed driving, avoid increase in wearing of tires and fuel consumption of the vehicle when the vehicle is driving in general road conditions, and save the necessary parking space.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A removable spoiler wing assembly, being able to be quickly assembled to or removed from a movable vehicle to enhance a downward pressing force applied to the movable vehicle during driving, the removable spoiler wing assembly comprising:
   a trunk lid portion, having a first end and a second end opposite the first end;
   a fix portion, being disposed on the second end of the trunk lid portion;
   a primary spoiler wing structure, being removably disposed on the fix portion; and
   a secondary spoiler wing structure, being removably disposed on the second end of the trunk lid portion, the fix portion or a support portion of the primary spoiler wing structure.

2. The removable spoiler wing assembly according to claim 1, wherein the primary spoiler wing structure further has and a primary spoiler wing, the primary spoiler wing is disposed on an upper end of the support portion, and the support portion is removably fixed by a lower end thereof and the fix portion.

3. The removable spoiler wing assembly according to claim 1, wherein the secondary spoiler wing structure has two secondary spoiler wings that are removably disposed on a left side and a right side of the second end of the trunk lid portion, the fix portion or the support portion of the spoiler wing structure respectively.

4. The removable spoiler wing assembly according to claim 3, wherein each of the two secondary spoiler wings has at least one air inlet extending from a front end of the secondary spoiler wing to a back end of the secondary spoiler wing.

5. The removable spoiler wing assembly according to claim 1, wherein the trunk lid portion further has an auxiliary air inlet.

6. The removable spoiler wing assembly according to claim 5, wherein the fix portion has at least one heat dissipation opening which communicates with the auxiliary air inlet.

* * * * *